Feb. 7, 1961  R. B. MULVANY ET AL  2,970,418
EGG HANDLING DEVICE

Filed March 6, 1958  6 Sheets-Sheet 1

INVENTORS
Richard B. Mulvany
Gilbert R. Barr
Eckhoff & Slick, Attys.
BY
A member of the firm

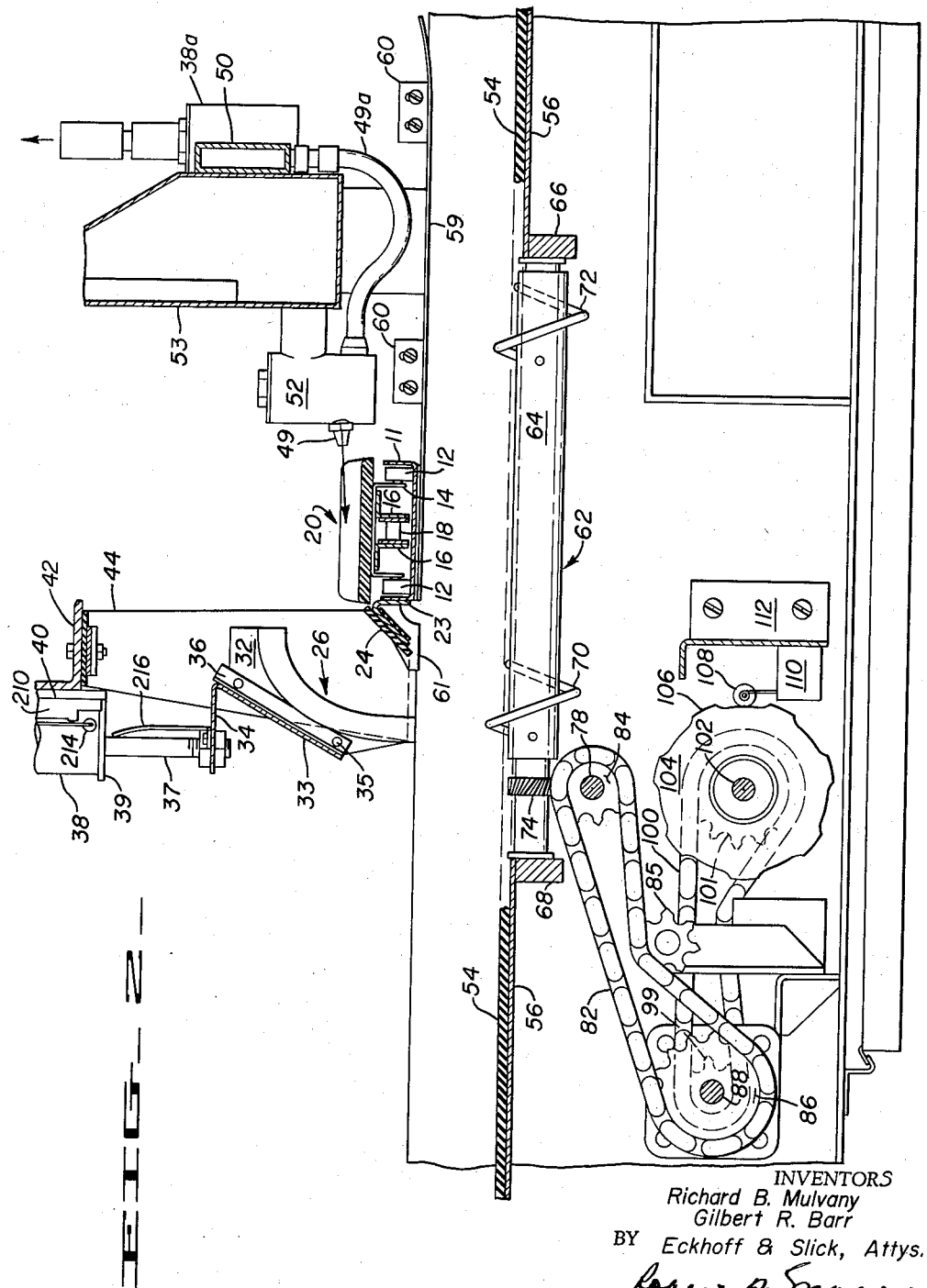

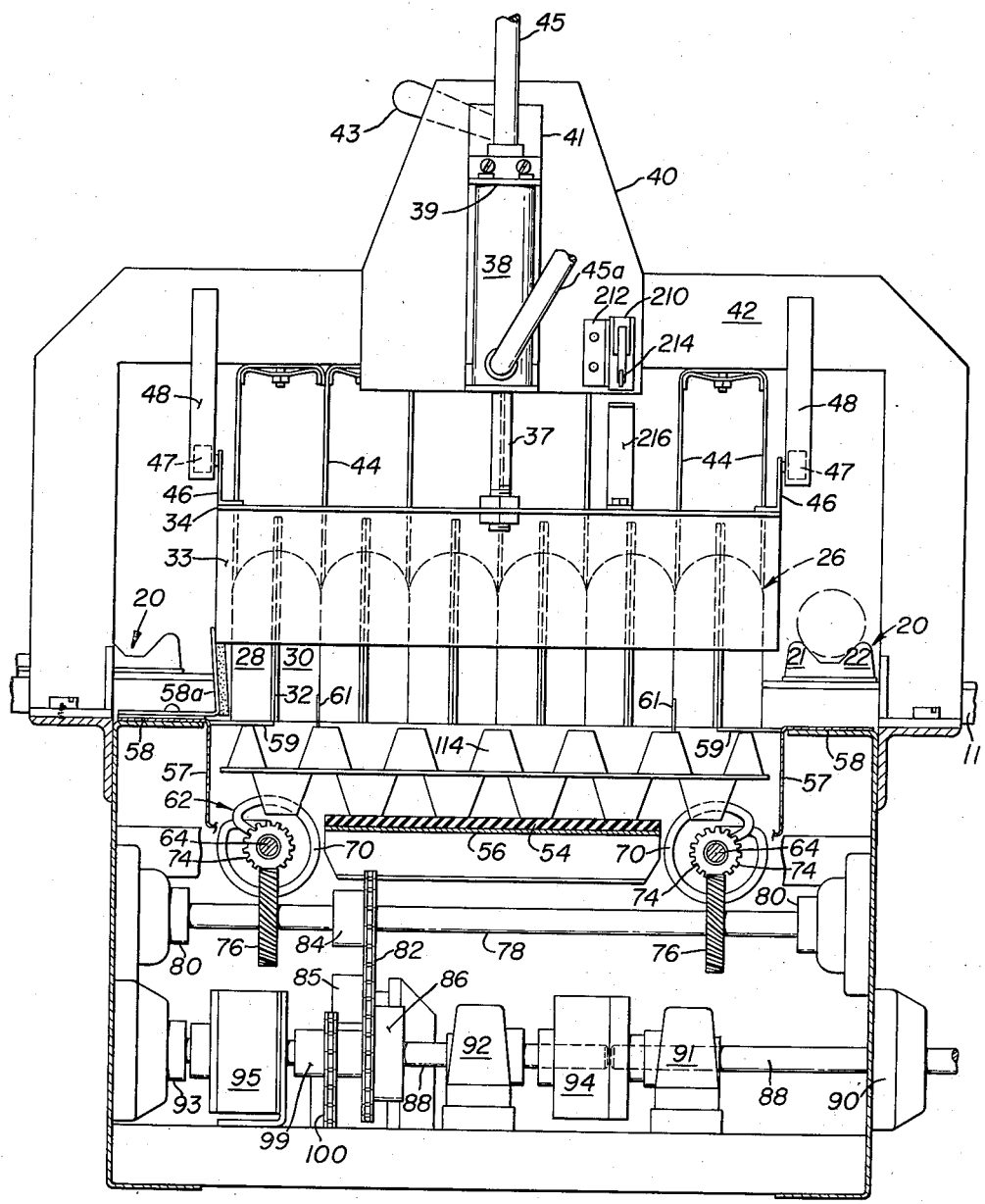

Feb. 7, 1961 R. B. MULVANY ET AL 2,970,418
EGG HANDLING DEVICE
Filed March 6, 1958 6 Sheets-Sheet 4
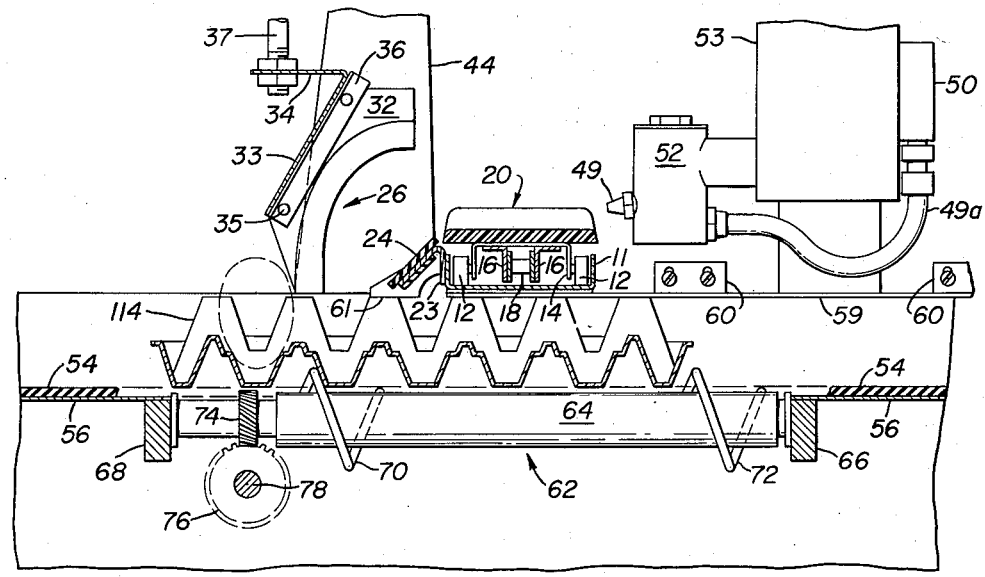
FIG_4_
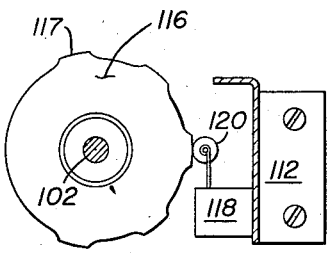
FIG_5_
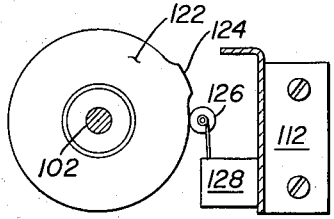
FIG_6_
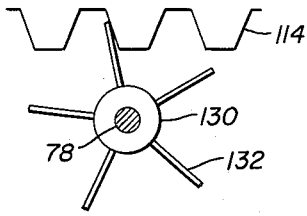
FIG_7_
INVENTORS
Richard B. Mulvany
Gilbert R. Barr
BY Eckhoff & Slick, Attys.
A member of the firm

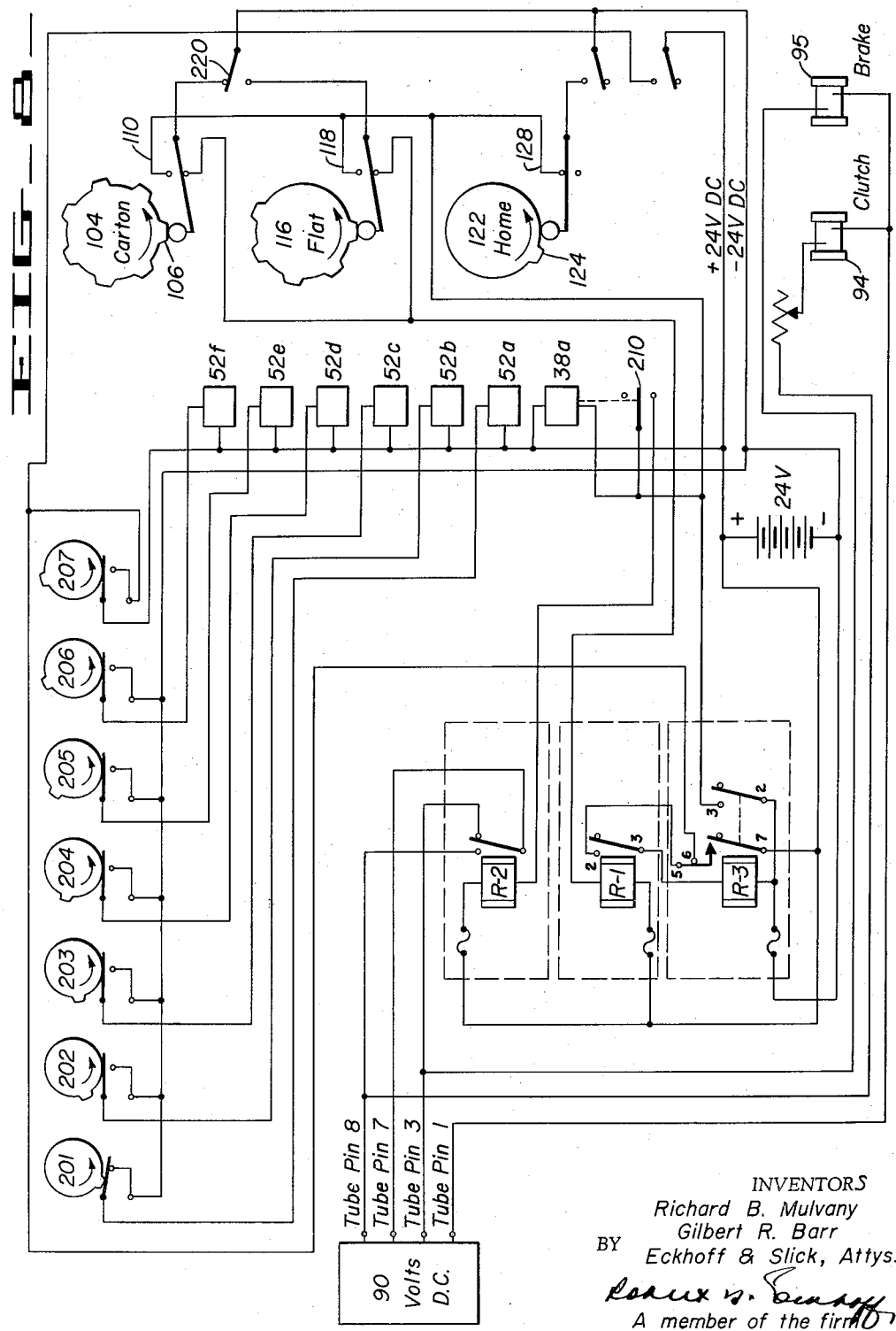

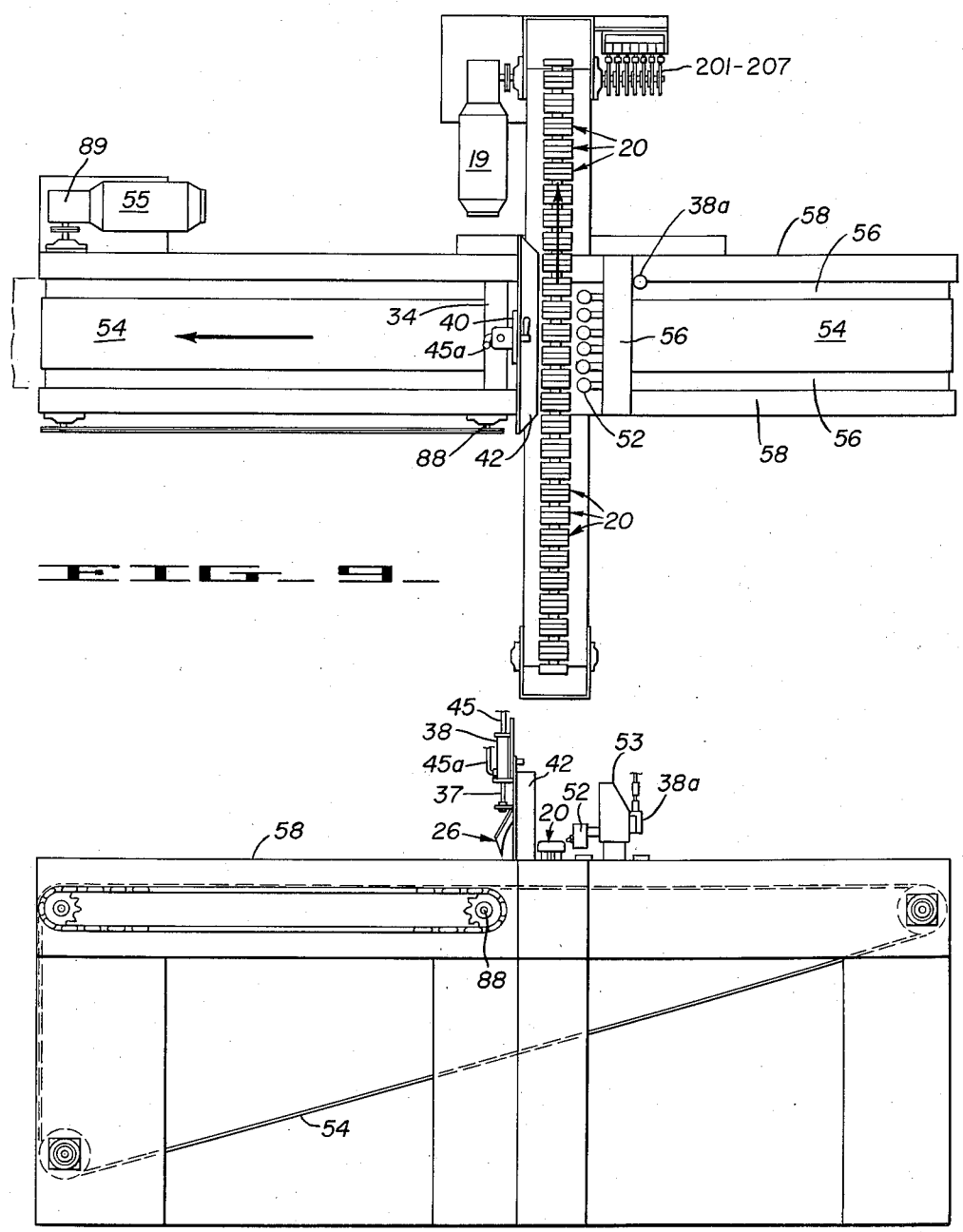

United States Patent Office 2,970,418
Patented Feb. 7, 1961

2,970,418

EGG HANDLING DEVICE

Richard B. Mulvany, Berkeley, and Gilbert R. Barr, Burlingame, Calif.; said Barr assignor to said Mulvany Filed Mar. 6, 1958, Ser. No. 719,621

18 Claims. (Cl. 53—251)

This invention relates in general to the handling of eggs and more particularly to a mechanism for transferring eggs from one conveyer to another conveyer, this second conveyer preferably carrying a conventional multi-cell egg package.

It is an object of this invention to present means whereby eggs which have been placed on a single file conveyor may be transferred rapidly therefrom into a multi-cell egg package without damage to the eggs.

It is a further object of this invention to provide an apparatus capable of filling multi-cell egg packages with eggs taken from a single file conveyor, the package being filled in such a fashion that the movement of the single file conveyor may be continuous.

A still further object of the invention is to provide for advancing the egg package in an intermittent but accurately and positively controlled fashion and synchronizing its movement with the discharge of eggs from the single file conveyor.

Yet another object of this invention is to provide a device which will operate as aforementioned and which is capable of handling various types of egg packages.

Further objects and advantages of this invention, if not specifically set forth, will become apparent during the course of the description which follows.

In the drawings:

Figure 2 is a fragmentary section on line 2—2 of Figure 1;

Figure 3 is a sectional view on line 3—3 of Figure 1;

Figure 4 is a fragmentary side elevational view, partially in section, of a portion of the apparatus, specifically, the single file conveyer, the egg dislodging mechanism and associated means for conveying the eggs into an egg package and advancing such package;

Figure 5 is a side elevation of a variant cam mechanism for use with packages of the type seen in Figure 4 which may be substituted for that having lobes equidistant from one another shown in Figure 2;

Figure 6 is an auxiliary cam which is preferably used in conjunction with the cam of Figure 5;

Figure 7 shows an alternative means for advancing multi-cell egg packages;

Figure 8 depicts the control mechanism and circuit;

Figure 9 is a top plan view of the entire structure; and

Figure 10 is a side elevation of the entire structure.

Figure 1:
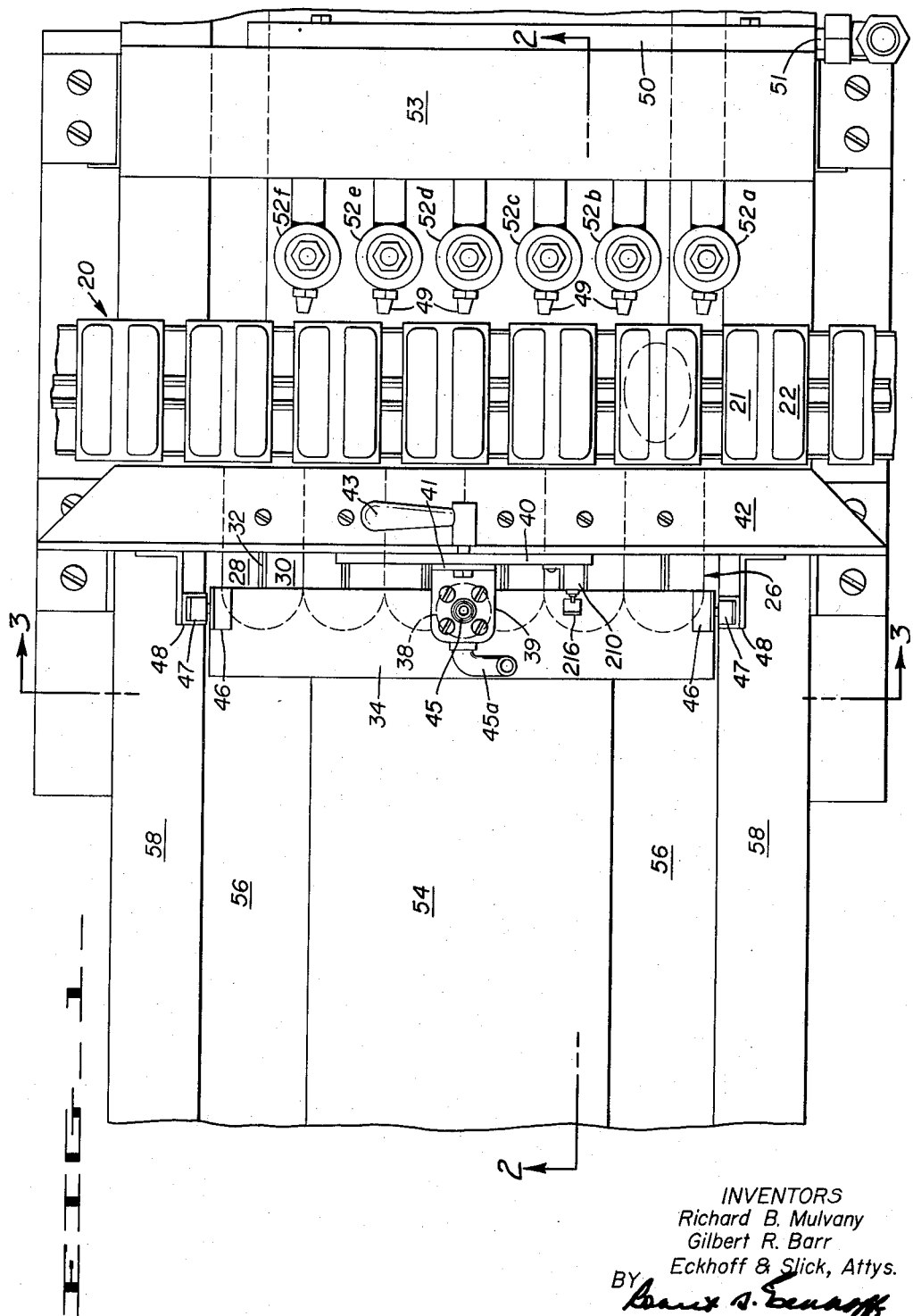
Figure 1 is a fragmentary top plan view of the apparatus of this invention.

A number of methods have been devised for transferring eggs from a single file conveyer to a second conveyer which supports and advances an egg package. Devices for performing this operation are set forth in the Barton patent U.S. 1,983,892, the Funk patent U.S. 2,045,767, the Swartz patent U.S. 2,160,319, the Page et al. patent U.S. 2,717,729 and the Benoit patent U.S. 1,869,457. Various of the devices shown there perform more than a single function, e.g., candling, weighing, etc. But many of them have this in common: at one point they find it necessary to transfer eggs from a conveyer such as a rotary or single file conveyer into egg packages. Most of these devices are rather complex, and, further, the fragileness of eggs makes the relatively rough treatment they ordinarily receive undesirable.

Generally, the device to be described in detail below comprises a single file conveyer having egg-supporting trays. Transversely across the line of and beneath the first conveyer runs a second conveyer upon which multicell egg packages are advanced. A plurality of egg deflectors and curtains forming conduits of sufficient diameter to allow passage of an egg therethrough are mounted adjacent the first conveyer. Thus, eggs which are dislodged from the first conveyer are conducted to packages on the second. The normal complement of these conduit assemblies is six, one for each of the linear cells in a row of the ordinary egg carton or filler flat. Approximately opposite each of the conduits is mounted an air nozzle which, on a signal, serves to issue an air blast of sufficient force to dislodge an egg from its conveyer support and direct it into the appropriate conduit.

A plurality of air-packaging units of this type may be employed, one for each of several package carrying conveyers, each, in turn, handling only one of several egg sizes or grades. Alternatively, a single one or more of the air-packaging units may be employed in an arrangement similar to those set forth in the above mentioned patents. Where a plurality of air-packaging units are used and where it is desirable therefore only to dislodge certain of the eggs at any one packaging station, means must be provided for retaining information with respect to the size, etc. of the egg in any given position and to actuate the air blast mechanism at the appropriate moment.

The egg carton is supported beneath the first conveyer by a second conveyer, and means must be provided for synchronizing the forward motion of the lowermost conveyer, or the package thereon, and the filling operation so that when a single row of a carton is filled, it will be allowed to advance but not before. One such device for performing this function is set forth in the Neaves Patent 2,704,177. However, the preferred structure is that which will be described below wherein the conveyer is allowed to advance continuously without interruption, and the forward motion of the packages is governed by the use of a pair of helices mounted one on either side of the conveyer in such a fashion that the outside pockets of an egg package are gripped and held whereby to prevent forward motion except when the helix turns. In this fashion, positive control over the movement of the egg package is obtained without necessity for stopping the advance of the main conveyer. Other advantages flow from this arrangement, as will be set out below.

Referring now to the drawings, wherein like characters refer to like parts throughout, a single file conveyer track or channel 11, best seen in Figures 2 and 4, confines rollers 12 on which is mounted U-shaped support 14. By means of brackets 16, an endless link chain 18 is secured to the U-shaped support, the chain being reeved about sprockets located at either end of the machine. Power is supplied by electric motor 19. An egg holder or tray 20 is riveted on U-shaped support 14. As seen in Figures 1 and 3, the holder is of an open ended, generally V-shaped or U-shaped design, the apex of the V or base of the U described by the egg-supporting ridges or cushions 21 and 22 lying transversely of the conveyer. It is important that egg supports 20 not be dish-like structures (raised at both ends) since this will make more difficult the sliding of the eggs from the surface of the egg supports at the appropriate moment and will tend to tumble the eggs. It is recommended that the egg supports be manufactured of a relatively slick and resilient material such as polyethylene. Hard materials, such as Bakelite, tend to cause breakage when eggs are dropped onto the conveyer for loading and material such as sponge rubber with a high coefficient of friction between the egg and the support tends to make the removal of the eggs from the supports more difficult. This is particularly important since if the bottom of the egg tends to skid across the egg support or the curtain support on the way to the package, it will tend to tumble and thus lose its proper small-end-down orientation in the package. It should also be noted that the air stream tends to separate the egg from its support on the single file conveyer and this is important even where the relatively slick material is used as a support.

At points of discharge of the eggs from the conveyer, track or channel 11 is provided with a bracket 23 which has mounted thereon a rubber fabric or other soft, flexible pad or mat 24. Each of the mats 24 is about two inches wide and has suspended thereover a relatively flexible and resilient curtain and deflector assembly, designated generally 26, and shown in section in Figures 2 and 4. The assembly, together with pad 24, forms a covered chute or a conduit open at either end. The deflector assembly is constructed of a pair of U-shaped and curved sections, 28 and 30 (see Figure 3), riveted or otherwise bonded together along the top or rear, the assembled U-shaped section being of a relatively slick and resilient material such as polyethylene, serving to aid in properly orienting the eggs and to protect the eggs from damage after they have left the support member 20. As seen in the drawings, these deflector sections are bonded along seam 32. The two halves of the assembly curve forward from the seam toward the egg in such a cross-section that the egg tends to contact the assembly on two points near its edge rather than along the more rigid seam. The deflectors are preferably constructed either of rubber or a plastic material of about the consistency of the polyethylene used in the conventional squeeze bottles, this being sufficiently flexible to absorb shocks and prevent breakage of the eggs. The deflectors extend downwardly to a point just slightly above the top of the tallest portion of an egg carton, means preferably being provided for adjustment of the normal height of the deflectors to accommodate cartons of various sizes, as will be described below. Each hood formed by the two deflector components 28 and 30 is secured to plate 33, having flange 34, by means of rivets 35 and bracket 36, in turn riveted or welded to flanged plate 33. The flange 34 of plate 33 supporting each of the deflector assemblies (see Figure 3), is bolted to plunger 37 which is capable of reciprocation away from or toward solenoid or air cylinder 38. The plunger is shown in its lowermost position in the drawings. This solenoid or cylinder is mounted on bracket 39 in turn supported by plate 40 and yoke 42. A suitable cylinder is the model U-11, 1⅛" bore 1½" stroke cylinder manufactured by the Ortho-Pneumatic Co. of Oakland, California. This cylinder is in turn controlled by a valve designated 38a in Figure 2 and Figure 8. A suitable valve is model V5D8600 3-way normally closed valve manufactured by the Skinner Electric Valve Division of the Skinner Chuck Co., New Briton, Connecticut. The yoke is bolted to brackets which are welded to the frame of the machine. The air cylinder and its bracket 39 are slidably mounted on plate 41 whereby on loosening handle 43 (see Figure 3), the entire unit may be adjusted either upwardly or downwardly so as to provide proper clearance for egg cartons of various heights beneath the curtains. Each of the deflector units comprising the hoods is separated by stationary rubber curtains 44. As shown in Figure 3, each of these is held by means of a bracket and bolt to the yoke 42. These curtains complement the aforementioned deflector assembly—the deflector sides being cut back in the area where the eggs are likely to strike since the polyethylene deflector assembly presents a rather hard edge, being rather thick, of necessity, if it is to retain its shape. A curtain assembly using material such as 1/32" soft neoprene with a single layer of duck can, stretched vertically, offer a soft and resilient edge which will hold its shape. Alternatively, instead of using the combination of deflector and rubber curtains, it is possible to form the deflector of a more resilient material such as neoprene rather than the polyethylene plastic described above whereby to provide a structure having sides which extend in a more forward fashion, positioning themselves immediately adjacent the single file conveyer, thus providing a shock absorber for the forwardly moving eggs. Air line 45 supplies air cylinder 38 with compressed air from a source therefor, not shown, as does line 45a. The two lines, 45 and 45a, co-operate in supplying air in such a fashion that the plunger 37, flanged plate 33 and the assemblies depending therefrom are raised and gently lowered at the proper moments. Bolted to either end of the flange 34 are brackets 46 to which are secured rollers 47 which ride in channels or guides 48 secured to yoke 42.

To the right of the single file conveyer, as viewed in Figures 2 and 4, appears the apparatus for directing air blasts at eggs on supports 20. Specifically, air nozzles 49 are preferably biased a few degrees in the direction of the conveyer movement. It has been found that a ⅛" orifice nozzle, operating at between about 35 p.s.i. and 65 p.s.i., depending upon the egg weight, and for a period of approximately 1½" of single file conveyer travel, is satisfactory to insure that the eggs are dislodged. Air is supplied to each nozzle 49 through a line 49a which takes air from manifold 50, in turn supplied by line 51. The operation of each individual air blast mechanism is controlled by an electric solenoid valve, designated 52a—52f, mounted above the air nozzle. A suitable valve is the model number 82622 normally closed solenoid valve manufactured by the Automatic Switch Co. of Florham Park, New Jersey. Additionally, suitable means are provided for regulating the air pressure, a valve placed in the system prior to the manifold being satisfactory. The air blast assembly is supported by frame 53.

A total of six deflector-curtain assemblies 26 preferably are provided, one corresponding to each of the six linear positions in a standard egg carton. For each of these reflector-curtain assemblies, a single air blast mechanism is provided as shown in Figures 1 and 4. The air blast mechanisms are constructed to operate synchronously with the arrival of eggs at the appropriate station, the forwardmost being dislodged first and each of the other eggs therebehind being dislodged sequentially thereafter.

Any of the standard egg cartons or filler flats may be used to receive the eggs, a certain amount of modification in the package handling method, however, being necessary if types other than of the molded pulp variety are selected. The householder's standard one dozen size molded pulp carton may serve or, alternatively, as shown in Figure 4, the filler flat, holding thirty eggs, may be filled using the apparatus. These packages have spaces between adjacent pockets of a type such that the preferred carton advancement-controlling mechanism, to be described below, may be used.

The package is supported on conveyor belt 54 driven by a prime mover 55, the conveyor belt preferably having a relatively smooth surface so as not to grip the bottoms of the egg cartons. Directly beneath the conveyor belt is provided a backing plate 56 to support the conveyor belt surface, the plate terminating at either side in upturned flanges 57 which may be bent at the top 58 to overlay a portion of the frame of the machine. A flanged plate 58a having a sponge rubber vertcial surface is bolted above the plate 58 and together these plates grip and hold the lowermost ends of the curtains at the left end. The sponge rubber provides a resilient backing for the curtains. The backing plate and flanges form a channel of a width slightly in excess of that of an egg package positioned transversely thereon, the conveyor belt being superposed on the central portion only of the channel formed by the backing plate and flanges 57. Positioned generally above and at either side of the backing plate 56, hold-down guides 59 are found (see Figure 2). It is the purpose of these hold-down guides to prevent the carton from climbing over the helix at such time as the helix, to be described below, stops turning. At such time the belt continues to advance and the carton has a tendency to climb over the helix. The vertical height of the hold-down guides requires a fairly delicate adjustment. The distance from the top of the belt to the bottom of the guides should exceed the height of the largest package being handled. Hence, each hold-down guide is mounted on bracket 60 having slots therein through which bolts or machine screws may be passed into the frame. Knife blades 61, bolted to the under side of the assembly, also aid in holding the carton in a proper position relative to the helices.

In the absence of these helices, the conveyor belt 54 would continuously advance the egg packages through the loading zone and would allow no opportunity for filling of the six cells in each row unless such filling was done virtually instantaneously.

The helix assembly, generally indicated as 62, is positioned in a space of about one foot of that area normally occupied by either edge of backing plate 56. The helix assembly 62 should preferably be constructed as shown in order to accommodate both one-dozen cartons, such as the Case-Ace 2 by 6 manufactured by the General Package Division of the Diamond Match Company, or Filler-Flats, such as the Kys 5 by 6 Filler Flat manufactured by the Keyes Fiber Company.

The Case-Ace Carton normally is shipped to the egg packer with its lid open. When this carton is moved by conveyor belt 54, with its lid trailing to the rear, the edge of the lid nearest the carton is approximately ⅜" above the belt. The helix construction takes advantage of this feature of the carton by extending above the belt top only about ⁵⁄₁₆" so that the lid will not engage the helix and so stop or jam the carton. As the helix only engages the egg pockets of the carton, only two revolutions of the helix are required to transfer one carton through the egg-packaging position.

The construction of the Kys 5 by 6 egg Filler Flat is such that the spaces between the flat's five rows of six egg pockets are approximately 1¹³⁄₁₆"; however, when two flats are placed end-to-end with their six egg rows parallel to each other, the egg rows in one will not be spaced an even multiple of 1¹³⁄₁₆" apart from the rows of the other flat—in fact, they will be offset about ¾" from an even multiple of 1¹³⁄₁₆". The same situation holds true if the flats are placed side by side with their six rows of five egg pockets parallel. This construction is necessary in order that the Kys Flat can be properly packaged in a standard 30-dozen egg case. However, it makes impractical the transfer of these flats by such a constant pitch device as a single pair of helices placed at opposite sides of the belt, such as would be the case if helices were placed only in the position of 70.

Difficulty would arise in transferring one flat away from a single helix and a new one in its place. If the seventh row of a flat is held by the helices, this flat would position the flat following so that the helix in rotating and allowing the two flats to be advanced by belt 54 would come up under the first row of the second flat and possibly jam or damage it. This condition is prevented by the construction shown in Figure 4 where two spaced helices 70 and 72 are positioned approximately 8½" apart along the direction of package travel.

When a new flat is about to be advanced into engagement with helix 72 the flat ahead is in engagement with helix 70 at its pocket row No. 2 (its first egg row). The 8½" spacing between the helices causes the seventh row of the flat to be held back from contacting helix 72 and permits the end of the flat to then position the new following flat in front of the helix 72 so that, as its helix assembly is rotated allowing belt 54 to advance the flats, the front end of helix 72 will rise up in front and clear of the first pocket row of the new flat.

When the new flat is about to be moved into engagement with helix 70 and the flat about to leave helix 70 is engaged at its row seven, the new flat is held back by helix 72 acting on the new flat's row five so as to again permit the leading edge of a helix to be rotated up in front of the new flat's row one.

An additional reason exists for the use of the two spaced helices on each side of the conveyor belt. Helix 70 is spaced directly below the egg row which is being filled by the air-packing unit and thus, the hold-down guides which are used to prevent the packages from climbing over the helices must be cut away in this area. This leaves only knife blade 61 to help hold the package down. The use of the two helices at each side of the package permits the helix 70 to operate solely on the package being filled while the helix 72 can be used to perform the more difficult job of holding back the several packages which may be stored on the packaging belt. Helix 72 can perform this more difficult job simply because it is doing so with the assistance of the hold-down guides 59.

Rectangular portions of the plate are removed, as shown in Figure 3, for the accommodation of the helices. Each helix has a drive shaft 64 journaled at either end in bearings 66 and 68 (see Figure 2) and mounted on the shaft are a pair of spaced helices 70 and 72. Bearings 66 and 68 are, in turn, suspended from the frame. Each of the helices is driven by a helical gear 74 which meshes with a second helical gear 76 (Figure 3) mounted on shaft 78. This shaft is journaled in suitable bearings 80 and is driven by endless link chain 82 reeved about sprocket 84 (Figure 2) keyed on the aforementioned cross shaft 78. The chain passes over idler 85 and is reeved about sprocket 86, the sprocket being keyed to the shaft 88 driven through a gear reducer 89 and chain 96 (Figure 9) by prime mover 55. The shaft is driven into two portions joined by a clutch, to be described, and is supported by bearings 90, 91, 92 and 93.

In order to provide for intermittent operation of the helices, means must be provided for interrupting the flow of power to endless link chain 82. This is accomplished in part by the use of a clutch coupling shown schematically at 94 in Figure 3. A suitable electric clutch is the type SF-250 clutch coupling manufactured by the Warner Electric Brake and Clutch Company of Beloit, Wisconsin. The clutch 94 operates in conjunction with brake 95, a suitable unit being type RF-250, also manufactured by Warner Electric Brake and Clutch Company.

On transmitting the appropriate signal to clutch and brake 95, the left hand portion of shaft 88 may be stopped. Thus, the endless conveyor belt 54, which is driven through gear reducer 89, will continue to advance, but the helix assemblies 62 will not turn.

Means by which the impulse is generated for transmission to the brake whereby to indicate the appropriate moment for stopping the helices is as follows:

Sprocket 99 is keyed to shaft 88 and endless chain 100 is reeved thereover and over sprocket 101 keyed to shaft 102. Mounted on this shaft is a carton cam 104 having seven equally spaced lobes. The cam shaft 102 is synchronized through the chain drive 100 with the rotation of the helix assembly such that the cam shaft makes one-seventh of a revolution for each revolution of the helix assembly. The lobes 106 of the cam 104 sequentially engage follower 108 of micro-switch 110 secured by means of a suitable bracket 112 to the frame of the machine. The micro-switches form no part of this invention in and of themselves and are of conventional design.

Figures 4, 5 and 6 show the necessary equipment for filling the Kys Molded-Pulp Filler Flat designated as 114 in Figures 3 and 4. Viewing the flat from its side as it moves down the conveyer belt, it can be seen that seven rows of pockets extend down to the belt level. Five of these pockets make up egg rows, but the two pockets at the ends of the flats do not contain eggs. Since all of the pockets engage the helix assembly, it is necessary to move the helix through three revolutions in order to make the transition from one flat to another after the five egg rows of a given carton have been filled. Therefore, the cams, as shown in Figures 5 and 6, are necessary. In the fashion of the aforementioned cam 104, each of these two additional cams is keyed to the cam shaft 102. Flat cam 116 is identical to cam 104 but with two adjacent lobes missing. In the absence of two lobes, the limit switch rides through what is equivalent to three of the smaller concave portions of the cam, thus causing each helix to make three entire revolutions.

It is obviously essential, also, that these three revolutions not be made when a filler flat has already started through the egg loading operation lest three empty rows be left in a flat. In order to achieve the desired results, it is necessary that a separate cam be provided having only a single lobe, this providing for indexing such that a "home position" is established for cam 116. Homing cam 122, having single lobe 124, is also mounted on cam shaft 102, the relationship of the single lobe of cam 122 to the five lobes of its co-operating cam 116 being that shown in Figures 5 and 6. When the single lobe 124 depresses cam follower 126, causing the micro-switch 128 to lock brake 94 and stop the rotation of helix 70, the flat may be placed on the conveyer belt which will advance the flat to the helices. Eight helix revolutions later, the coaxially mounted cams will be positioned as shown in Figures 5 and 6, a single row of eggs will have been deposited and the package will have been advanced to the position shown in Figure 4. Thus, a manually closed circuit through limit switch 128 is allowed to govern the rotation of the helix assembly 62 (through the clutch and brake mechanisms) until lobe 124 strikes cam follower 126 thereby stopping the movement of the helices. It is then time to place a filler flat on the conveyer belt which advances it to the point of contact with the first of the two helices. The first flat can now be manually jogged into the filling position. On the fourth jog, cam 116 will leave the limit switch and allow the helices to rotate three times until the cam lobe 117 engages the follower 120 of limit switch 118. The first flat will now be positioned for filling, that is, one position behind that shown in Figure 4. As long as the package conveyer is kept filled with flats, each succeeding flat will be correctly indexed through the station. Thereafter, micro-switch 118 is allowed to govern the action of the helices through the brake and clutch—so as to provide for five stops at the loading station—wherein a row of egg cells is positioned beneath the mouth described by the curtain deflector assembly and mat. A suitable micro-switch for 110, 118 and 128 is the model B-Z-2RW 822541 switch manufactured by the Minneapolis-Honeywell Company of Freeport, Illinois.

In Figure 7, an alternative package advancing means is indicated. Specifically, Figure 7 depicts an alternative to the helix assembly 62, the alternative constituting a paddle wheel-like assembly consisting of a hub 130 mounted on shaft 78 in the position normally occupied by gear 76, a series of pins or paddles 132 extending outwardly from the hub 130. These paddles extend somewhat above the level of the conveyor surface and serve the function of the helices in that they prevent advancement of the cartons or packages when shaft 78 is not turning. Very little modification of the basic structure is necessary to provide for use of the alternative structure—about the only necessary change being in the gear ratios used such that shaft 78 will turn at an appropriate speed for the paddle wheel structure—as contrasted with the much more rapid pace necessary where the helical gear driven helix assemblies 62 are employed. Like the helices, the paddle wheel elements are preferably mounted at either side of the main conveyer, but, alternatively, it is obviously possible to place one or more of them at any spot across the conveyer. For example, two separate conveyers might be placed at either side leaving a slot in the center through which the paddles 132 (or helix elements 70 and 72) might protrude.

Figure 8 shows the electrical circuit for the automatic egg packaging machine described above. The electrical circuit controls the packagin station by its control of the package indexing clutch and brake assemblies, the egg deflector, and the air packaging valves. The control signals originate from two sets of cams. One set, 104, 116 and 122, the package indexing cams, is that described earlier. The other cams, 201–207, are mounted on the single file conveyor drive shaft. This shaft makes one revolution for every six eggs traveling on the single file conveyor. Cams 201 through 206 control the operation of the air-packaging valves 52a through 52f in a sequential fashion by closing the various limit switches associated with the cams and thus completing the circuit. After the operation of cam 206, cam 207 supplies a pulse to start the package indexing cycle (helix or paddle wheel).

The package indexing cycle requires that the egg deflector assembly be raised out of the way of the already packaged eggs and then the clutch be engaged to rotate the helix assemblies through the correct number of revolutions to move the egg package into position for the next egg row to be filled. The control circuit also permits manually applied pulses to transfer egg packages through or to the packaging station, as desiired by an operator. The operator may also select the type of operation required for the packaging station to properly transfer either cartons or flats. Finally, the operator, is able to properly index the station to permit the initial loading of flats into the packaging station so that they will be properly indexed automatically thereafter so long as the packaging station is kept filled with the flats.

The control circuit can be broken down into six functional areas.

Area 1 includes the control switches to select between flat or carton operation; the home switch which, when held down, permits the operation of the indexing device to properly set the station up to receive flats; and a jog switch to permit the manual pulsing of the package indexing device.

Area 2 includes the control cams which permit the packaging helices to make the correct number of revolutions after a manual jog pulse or an automatic pulse from the cam 207.

Area 3 is the cam 207 which automatically pulses the package indexing device after the sixth egg has been placed in the package.

Area 4 is limit switch 210 which is secured by means of bracket 212 to plate 40 (see Figure 3). The switch has a follower 214 which rides on tongue 216 bolted to flange 34 of plate 33. A suitable limit switch is switch 11–304/70–104 manufactured by the Licon Switch and Controls Division of the Illinois Tool Works, Chicago, Illinois. The switch permits the helices to move the package forward only after the deflector has been raised clear of the eggs in the package.

Area 5 is the clutch and brake assemblies.

Area 6 includes the brake and clutch rectifier, such as a Warner CW 600 90 v. D.C. (for which proper connections are shown in the schematic) and the three control relays of conventional design.

Assuming that dozen size cartons are being employed, the selector 220 will then be in the carton position. At the time the indexing device (helix, etc.) is stationary, one of the cam lobes 106 will be operating the carton limit switch 110 and will close the normally open contacts. This energizes relay R-1 and closes its normally open contacts. The pulse from cam 207 passes through the normally closed contacts of relay R-3 via pin 6 and thence from pin 5 through the closed contacts of energized relay R–1, energizing R–3 which closes pins 7 and 5, and subsequently breaking the circuit between pins 5 and 6 or relay R–3, locking R–3 in through relay R–1 and opening the normally closed contacts of R–3, thus disconnecting R–3 from the pulsing cam 207. The operation of R–3 also closes the normally open contacts between pins 2 and 3. This operates 38a which raises the deflector 28 and 30, closing limit 210 which then finally operates relay R–2, which transfers from its normally closed or brake-on position over to close its normally open contact and thus engage the clutch 94 and release the brake 95. The engagement of the clutch starts to rotate the helix assemblies as well as the carton, flat and home cams. As soon as the carton cam 104 moves far enough to open the normally open contacts of its limit switch, R–1 is de-energized, opening its normally open contacts between pins 2 and 3, thus dropping out relay R–3. However, there is now a circuit through the carton limit switch 110's normally closed contacts that continues to hold the deflector 28 and 30 up and keep R–2 energized and the clutch 94 operating. The purpose of R–1 and R–3 is to assure that a short pulse from a manual jog or from cam 207 will complete one cycle of the package indexing device 62. As long as the carton limit switch 110 is off of a lobe 106, it will continue to hold the clutch 94 engaged. When the next lobe comes up, opening the normally closed contacts of switch 110, the circuit from the limit switch through valve 38a and R–2 is opened and the brake is engaged and the clutch disengaged. R–1 is also immediately picked up to await the next pulse which will start another cycle.

The operation is substantially the same where the flats are being filled excepting for the first steps wherein the first egg cell row is positioned below the conduits' discharge ends. This operation has already been described and will not be repeated here.

In operation, egg-supporting units 20 are loaded with eggs lying in a transverse axis relative to the egg conveyer itself. The conveyer advances the eggs in the direction of the air-packaging station. At the point when it is desired to remove an egg from any given supporting unit 20, a blast of air is supplied through ⅛" orifice of nozzle 49 at about 35 to 65 pounds p.s.i.—the pressure needed depending on the egg weight. The air blast is initiated just prior to the point when the individual egg-holding unit is directly in front of the appropriate curtain deflector assembly. The air blast continues for a period of approximately 1½" of the single file conveyer travel. As indicated earlier, it is preferred to employ an information holding device of some variety so as to indicate when and where to transfer a specific egg. This is essential where a separate carton conveyer line is provided for various types of eggs—graded according to size and quality. However, the device is suitable for use in merely transferring eggs from a single file conveyor into cartons and, for the sake of simplicity, such use is described here. The stream of air directed at the egg slides it from the support and tilts it vertically at a 90° angle with its pointed end down whereupon the egg drops through the rubber curtains and deflector assembly and into the package. The egg transferring operation proceeds sequentially in a direction opposite to conveyer movement. This allows adequate time for the egg carton to advance a single row to ready for the next group of six eggs without necessity for slowing or stopping the single file conveyer.

The deflector and curtain assembly serves several purposes. The curtain absorbs the sideward motion imparted to the egg by the movement of the conveyer; if the egg should touch the back of the deflector, the deflector helps direct it down into the package and helps prevent more than a 90° rotation. It has been found that it is necessary to keep the height measured from the bottom of the egg support to the top of the entrance to the deflector to no more than about 2 5/16" so that the egg, if it touches the deflector, will touch it before it has had a chance to rotate too far past the vertical. Further, the assembly separates the eggs from each other after they have left the conveyer, separating each row of eggs in the package from each other as well as each egg across the package station. Finally, it directs the air stream from the packaging nozzle down into the package where the deflection of air from the bottom of the package tends to create a cushion into which the egg may drop.

Since the bottom of the deflector or conduit is positioned just above the top of the package and curves around behind the egg being placed in the package, the deflector must be raised somewhat before the package with its filled row can be advanced. This is accomplished by synchronizing the action of the solenoid or air cylinder so as to raise the deflector assemblies 26 just prior to initiating rotation of the helices 62.

Use of the air in the operation has several advantages. It tends to break the friction between the egg and its support 20 by lifting the egg away from the support. It also tends to assist in rotating the egg 90° to the vertical by raising the larger end of the egg and thereby directing the pointed end downwardly. The air cushioning effect in the package, as described above, makes possible the dropping of the eggs for a reasonable distance without breakage. Air offers a fast but gentle means of moving the egg from the single file conveyer. While the egg generally contacts the flexible curtain and flexible deflector, those portions of the apparatus which it does touch in moving from the egg support to the carton are sufficiently resilient that they do no damage to the egg. For the most part, the egg is transported in air from the time it leaves support 20 until it falls into the pocket in the egg package.

As indicated above, the supporting means on the conveyer should be of a V or U shape, having the trough thereof running transversely with respect to the conveyer itself, that is, pointing toward the curtain deflector assemblies. An ordinary concave or dish-like structure will tend to retain the egg within the pocket unduly and decrease the effectiveness of the air as a transfer medium as well as tending to tumble the egg by tilting it initially. The use of air tends to move the egg in such a fashion that the egg is lifted free of the support while being moved in a forwardly direction.

Where ordinary one dozen size cartons are handled, the carton is placed on the continuously advancing conveyer 54. The helices, each of which preferably rotates in an opposite direction, turn intermittently whereby to first allow for advance of the carton one space and thereafter stop its movement for a sufficient time to provide for filling of one row of the carton. Hold-down guides 59 prevent the package from climbing the helix when the latter is stationary.

The operation of the mechanism where the Kys Filler Flat is used has been described earlier.

While a complementary curtain and deflector structure has been described in detail whereby to provide for conducting the egg from either a rotary or straight line single file conveyer into cartons or packages placed beneath the conveyer, it obviously is possible to modify the structure while still employing the air transfer principle. That is, it is possible to advance the packages upwardly at an angle so that the packages pass directly opposite the egg supports 20 with the open cells more or less facing the pointed ends of the eggs on the conveyer. A blast of air applied at this point transfers the eggs from the supports to the corresponding cells in the package, the air tending to cushion the eggs as they strike the cell bottoms. Yet with this structure, because of the proximity of the package to the eggs, the conduits are rendered unnecessary.

Obviously, where this method is used, the carton must be moved upwardly and tilted at an angle such that after the eggs have been transferred into the cells, they will not again fall out.

The deflector and curtain assembly has been described as constituting a fully enclosed conduit. However, it is obvious that a certain amount of elimination of the side curtains is possible whereby to form an assembly which is not entirely enclosed in the fashion of the preferred assembly but is still capable of functioning in a fashion similar to the conduit assembly. That is, were the curtains largely eliminated, most of the eggs would still be forced directly toward the deflector components 28 and 30 and because of the presence of these deflector components, the air blast would serve to cushion the eggs somewhat and prevent breakage while directing the eggs in the proper direction. Hence, the word "conduit" as used in the claims which follow does not necessarily mean an entirely enclosed structure but rather is intended to imply a generally confining structure—one having as essentials, the generally U-shaped deflectors forming the hood and the pad 24 whereby to provide means for controlling the egg movement upwardly and downwardly.

Obviously, many modifications and variations of the invention as hereinbefore set forth may be made without departing from the spirit and scope thereof, and therefore only such limitations should be imposed as are indicated in the appended claims.

We claim:

1. In an egg handling machine, the combination comprising: a single file conveyer for advancing a series of eggs; a conduit mounted adjacent said conveyer for receiving an egg; means mounted opposite said conduit for directing an air blast against an egg carried by said conveyer whereby to urge said egg into said conduit; a second conveyer for a multicell package adjacent the discharge end of said conduit; means for continuously advancing said second conveyer; a helix mounted beneath said second conveyer, said helix being of sufficient height to engage an egg pocket of an egg package; and means for intermittently rotating said helix whereby to provide for successive registration between rows of cells of egg cartons and said conduit.

2. In an egg handling machine, the combination comprising: a single file conveyer for advancing a series of eggs; conduit mounted adjacent said conveyer for receiving an egg; means mounted opposite said conduit for directing an air blast against an egg carried by said conveyer whereby to urge said egg into said conduit; a support for a multicell package adjacent the discharge end of said conduit; means to advance said support to successively pass rows of cells of said package past said conduit discharge end; a helix mounted beneath said support, said helix being of a sufficient height to engage an egg pocket of an egg package; and means for intermittently rotating said helix whereby to provide for successive registration between rows of cells of egg packages and said conduit; said support being mounted on a frame having means for limiting the upward movement of said egg package while said package is engaged by said helix whereby to prevent said package from climbing over said helix.

3. In an egg handling machine, the combination comprising: a single file conveyer for advancing a series of eggs; a plurality of downwardly leading conduits mounted adjacent said conveyer for receiving said eggs; means mounted opposite each of said conduits for directing an air blast against eggs carried by said conveyer whereby to urge said eggs from said conveyer into said conduits; a second conveyer for a multicell egg package mounted beneath and adjacent said conduits; drive means for continuously advancing said second conveyer; a pair of helices positioned beneath said conveyer, said helices being of sufficient height to engage an egg pocket of an egg package; a continuously operating drive means for said helices, said drive means being connected to said helices through a clutch mechanism; and means for disengaging said clutch while a row of cells of an egg package is being filled whereby to stop rotation of said helices.

4. In an egg handling machine, the combination comprising: a single file conveyer for advancing a series of eggs, said conveyer having a series of open ended supporting elements for eggs, the open ends of each of said elements being oriented transversely relative to said egg conveyer, said egg supports being constructed of a relatively resilient material; a conduit mounted adjacent said conveyer for receiving said eggs from said supporting elements; means mounted opposite said conveyer for directing an air blast against eggs carried by said conveyer whereby to urge said eggs from said supporting elements into said conduit; a support for a multi-cell egg package positioned adjacent the discharge end of said conduit; and means for advancing said support to successively register rows of cells of said package with said conduit discharge end.

5. In an egg handling machine, the combination comprising: a single file conveyer for advancing a straight line series of eggs; a plurality of downwardly leading conduits mounted adjacent said conveyer for receiving said eggs, said conduits being constructed of a flexible resilient material; means mounted opposite each of said conduits for directing an air blast against eggs carried by said conveyer whereby to urge said eggs from said conveyer into said conduits; a second conveyer for multicell egg packages positioned beneath and adjacent the discharge ends of said conduits; means for continuously advancing said second conveyer; means for intermittently interrupting the forward advance of egg packages on said conveyer and for successively causing registration of the said conduit discharge ends and the rows of cells of said packages.

6. The apparatus of claim 4 wherein means are provided for automatically raising said conduits as a group following filling of a row of cells in an egg carton whereby to provide clearance for the tops of said eggs in said filled rows; said means automatically returning said conduits to a position immediately above an empty row of carton cells when a new row has been advanced into position by said continuously moving second conveyer.

7. In an egg handling machine, the combination comprising: a single file conveyer for advancing a series of eggs, said conveyer carrying a plurality of generally U-shaped supporting elements, the trough of each U described by each of said elements being transversely oriented relative to said conveyer, said supports being constructed of a relatively resilient material; a plurality of downwardly leading conduits mounted adjacent said conveyer for receiving said eggs; means mounted opposite each of said conduits for directing an air blast against eggs carried by said conveyer whereby to urge said eggs from said U-shaped supports into said conduits; a second conveyer for a multi-cell egg package positioned beneath and adjacent said conduits; means for continuously driving said second conveyer whereby to advance a multi-cell egg package; a pair of helices, one mounted at either side of said second conveyer, said helices each being of sufficient height to engage an egg pocket of a passing egg package; means for intermittently rotating said helices whereby to provide successive registration between rows of cells of egg packages and said conduits; means for raising the conduits as a group following the filling of a row of cells in an egg package whereby to provide clearance for the tops of eggs in said filled row and thereafter lowering said conduits into position directly over an egg package after an empty row of cells has been advanced by said conveyer to a position beneath said conduits.

8. In an egg handling machine, the combination comprising: a single file conveyer for advancing a series of eggs, said conveyer carrying a plurality of generally U-shaped egg supporting members, the trough of the U described by each of said supporting members being oriented transversely relative to said conveyer, said supporting members being constructed of a relatively slick, resilient material whereby to decrease friction between said supports and eggs placed thereon; a plurality of downwardly leading conduits mounted adjacent said conveyer for receiving said eggs, said conduits being constructed of a flexible resilient material, means mounted opposite each of said conduits for directing air blasts against eggs carried by said U-shaped support members whereby to urge said eggs into said conduits; means for operating said air blasts in a sequential fashion whereby to force the most advanced of the eggs on said U-shaped support members therefrom first; a second conveyer for multicell packages positioned beneath and adjacent said conduits; means for continuously advancing said second conveyer whereby to advance said egg packages; a pair of helices, one mounted at either side of said second conveyer; said helices each being of sufficient height to engage an outer pocket at either side of an egg package; a continuously operating drive means for said helices, said drive means being connected to said helices through a clutch and drive mechanism; a brake operatively associated with said clutch; means for disengaging said clutch while a row of cells in an egg package is being filled and for applying said brake simultaneously and for engaging said clutch and releasing said brake thereafter when a row of cells of an egg package is completely filled; means synchronized therewith for raising said conduits as a group following the filling of a row of cells in an egg package whereby to provide clearance for the tops of eggs in said filled row and for returning said conduits to a lowered position when an empty row of cells has been advanced to a point beneath said conduits by said second conveyer.

9. A machine for advancing packages comprising: a conveyor and means mounted adjacent thereto for controlling the forward motion of said packages, said control means comprising at least one assembly of two spaced helices positioned along the direction of travel of said conveyor, at least a portion of each of said helices extending above the top of said conveyor so as to engage said packages sequentially; and means for rotating said helix assembly so as to allow said conveyor to advance each of said packages.

10. A machine for advancing an egg carton having a lid which trails thereafter in an open position while said carton is being filled comprising: a conveyer for supporting said carton; means for continuously forwardly advancing said conveyer; and means for controlling the forward motion of said carton independently of the motion of said conveyer, said control means comprising at least one assembly of two spaced helices positioned along the direction of travel of said conveyer and each extending above the top of said conveyer to a height sufficient to positively engage the egg pockets of said egg carton, said helices extending above the top of said belt to a height less than that necessary to contact the lid of said carton when said lid is in an open position; and means for rotating said helix assembly so as to allow said conveyor to advance said cartons sequentially.

11. The structure of claim 10 wherein each helix assembly consists of two helices mounted on a single drive shaft, said two helices being so spaced that the second of said helices will engage a carton at the time the first of said helices is also engaging a carton whereby to provide means for separating the carton to be filled from any cartons following there behind.

12. In an egg handling machine, the combination comprising: a single file conveyor for advancing an egg; an open-ended supporting element for an egg mounted on said conveyor, the open ends of said supporting element being oriented transversely relative to said conveyor; means for dislodging said egg from said supporting element, said means comprising an air nozzle positioned at about the height of said conveyor and to one side thereof, said nozzle being oriented to direct at least a portion of a blast of air therefrom between the lower surface of said egg and the upper surface of said open-ended element; and a source of air under pressure for said nozzle.

13. In an egg handling device, the combination comprising: a single file conveyor for advancing an egg; an open-ended supporting element for an egg mounted upon said conveyor, the open ends of said supporting element being oriented transversely relative to said egg conveyor; a conduit mounted adjacent said conveyor for receiving an egg from said supporting element; means mounted opposite said conduit and on the far side of said conveyor for directing an air blast against an egg carried by said supporting element whereby to urge said egg into said conduit, said nozzle being oriented to direct at least a portion of a blast of air therefrom between the lower surface of said egg and the upper surface of said open-ended supporting element; a support for a multi-cell package positioned at the discharge end of said conduit; and means to move said support to successively register the rows of said package with said conduit.

14. In an egg handling machine, the combination comprising: a single file conveyor for advancing eggs; a series of open-ended supporting elements for eggs mounted upon said conveyor, the open ends of each of said elements being oriented transversely relative to said egg conveyor; a plurality of conduits mounted adjacent said conveyor for receiving eggs from said supporting elements; means mounted opposite each of said conduits and on the far side of said conveyor for directing an air blast against eggs carried by said supporting elements, whereby to urge said eggs into said conduits, each of said air blast directing means being oriented to direct at least a portion of an air blast therefrom between the upper surface of an egg supporting means and the lower surface of an egg resting thereon; a second conveyor adjacent the discharge ends of said conduits for advancing a multi-cell package; means associated with said second conveyor for interrupting the advance of a multi-cell package on said second conveyor whereby to enable intermittent advancement thereof; and means for registering rows of egg-receiving cells in said package successively with the discharge ends of said conduits.

15. In an egg handling machine, the combination comprising: a single file conveyor for advancing a series of eggs; a series of open-ended supporting elements for eggs mounted upon said conveyor, the open ends of each of said elements being oriented transversely relative to said egg conveyor; a plurality of conduits mounted adjacent said conveyor for receiving eggs from said supporting elements; means mounted opposite each of said conduits and on the far side of said conveyor for directing an air blast against eggs carried by said supporting elements whereby to urge said eggs into said conduits, each of said air blast directing means being oriented to direct at least a portion of an air blast therefrom between the upper surface of said egg-supporting element and the lower surface of an egg resting thereon, said air blast directing means being provided with means for initiating said blasts in a sequential fashion, the forwardmost of said air blast directing means being actuated first whereby to dislodge the forwardmost egg first; a second conveyor for supporting a multi-cell package mounted adjacent the discharge ends of said conduits; means for advancing said second conveyor and means operatively associated with said second conveyor to intermittently restrict the advancement of an egg package thereon whereby to successively register the cells of said package with said discharge ends of said conduits.

16. In an egg handling machine, the combination comprising: a single file conveyor for advancing a series of eggs, said conveyor having a series of relatively resilient supporting elements for eggs, each of said supporting elements having at least one open end, said open end of each of said elements being directed to one longitudinal side of said egg conveyor; a conduit mounted adjacent said conveyor for receiving said eggs from said supporting element, said conduit being adjacent that side of said conveyor toward which the open end of each of said supporting elements is directed; means mounted opposite said conveyor for directing an air blast against eggs carried by said supporting elements whereby to urge said eggs from a supporting element into said conduit; a support for a multi-cell egg package positioned adjacent the discharge end of said conduit; and means for advancing said support to successively register rows of cells of said package with said conduit discharge end.

17. In an egg handling machine, the combination comprising: a single file conveyor for advancing an egg; a supporting element for an egg mounted on said conveyor, said supporting element having at least one open end, the open end of said supporting element being oriented toward one longitudinal side of said conveyor; means for dislodging said egg from said supporting element, said means comprising an air nozzle positioned at about the height of said conveyor at one side thereof, said air nozzle being positioned at the side of the conveyor opposite that toward which said open end of said supporting element is directed, said nozzle directing at least a portion of a blast of air therefrom between the lower surface of said egg and the upper surface of said open-ended element; and a source of air under pressure for said nozzle.

18. In an egg handling machine, the combination comprising: a single file conveyor for advancing a series of eggs, said conveyor having a series of supporting elements for eggs, each of said supporting elements having at least one open end, the open end of each of said elements being oriented toward one side of said conveyor; a conduit mounted adjacent said conveyor for receiving said eggs from said supporting elements, said conduit being adjacent that side of said conveyor toward which said open ends of said supporting elements are oriented; means mounted opposite said conveyor for directing an air blast against an egg carried by a supporting element whereby to urge an egg from said supporting element into said conduit; a support for a multi-cell package positioned adjacent the discharge end of said conduit; and means for advancing said support to successively register rows of cells of said package with said conduit discharge end.

References Cited in the file of this patent

UNITED STATES PATENTS

| | | |
|---|---|---|
| 1,090,855 | Jagenberg | Mar. 24, 1914 |
| 1,284,781 | Rogers | Nov. 12, 1918 |
| 2,293,290 | Gammeter | Aug. 18, 1942 |
| 2,536,249 | Archer | Jan. 2, 1951 |
| 2,640,637 | Baechle | June 2, 1953 |
| 2,730,226 | Day et al. | Jan. 10, 1956 |
| 2,785,610 | Meye-Jagenbert et al. | Mar. 19, 1957 |